United States Patent
Takahasi et al.

[11] Patent Number: 6,148,946
[45] Date of Patent: Nov. 21, 2000

[54] EXCAVATOR OPERATOR CAB

[75] Inventors: Masahiro Takahasi, Acworth; Shu Yoshida, Woodstock; Michael P. Norris, Calhoun, all of Ga.

[73] Assignee: Kobelco America, Inc., Calhoun, Ga.

[21] Appl. No.: 09/047,844

[22] Filed: Mar. 25, 1998

[51] Int. Cl.[7] .................................................. B60K 26/00
[52] U.S. Cl. ........................ 180/316; 180/315; 180/333
[58] Field of Search .................................. 180/315, 316, 180/333, 335, 336

[56] References Cited

U.S. PATENT DOCUMENTS

| | | |
|---|---|---|
| 2,127,323 | 8/1938 | Breer . |
| 4,055,230 | 10/1977 | Kestian et al. . |
| 4,552,503 | 11/1985 | Mouri et al. ............................. 414/687 |
| 4,776,750 | 10/1988 | Griswold, Jr. et al. ................. 414/698 |
| 4,852,660 | 8/1989 | Leidinger et al. ...................... 172/795 |
| 4,966,240 | 10/1990 | Aikawa .................................... 172/825 |
| 5,232,057 | 8/1993 | Renard .................................... 172/812 |
| 5,277,258 | 1/1994 | O'Dell .................................... 172/812 |
| 5,471,908 | 12/1995 | Lech ......................................... 91/156 |
| 5,596,824 | 1/1997 | Scott et al. ................................ 37/403 |
| 5,638,866 | 6/1997 | Mueller ................................. 137/636.2 |

FOREIGN PATENT DOCUMENTS

| | | | |
|---|---|---|---|
| 54-53422 | 4/1979 | Japan ...................................... 180/336 |
| 4-317875 | 11/1992 | Japan ...................................... 180/315 |

OTHER PUBLICATIONS

Kobelco Control Manual, pp. 2–2, Fig. 2.2; p. 3–6, Fig. 3.19.
Caterpillar D5M Brochure, pp. 8, 9, & 10.
John Deere 750 C 850 C Brochure, pp. 5, 6, & 7.
Caterpillar 312 B Brochure, p. 4.
Caterpillar D5C Brochure, p. 8.

*Primary Examiner*—Eric Culbreth
*Attorney, Agent, or Firm*—Kennedy, Davis & Hodge, LLP

[57] ABSTRACT

An excavator operator cab (10) has an operator seat (12) and a control console (15) mounted beside the seat. A forward control stick (20) and a rear control stick (22) are positioned in the console (15) such that the rear control stick supports the arm of the operator while he grips the forward control stick. The forward and rear control sticks (20,22) are manipulated independently or in concert with one another.

4 Claims, 2 Drawing Sheets

EXCAVATOR OPERATOR CAB

TECHNICAL FIELD

This invention relates generally to cabs for earth moving equipment such as excavators and dozers, and particularly to control consoles for such cabs.

BACKGROUND OF THE INVENTION

Earth moving equipment such as excavators and dozers have cabs where an operator sits and operates the equipment. In doing so the operator must manipulate several different controls, often simultaneously. These controls control movement of the equipment since such are usually mobile with independently driven tractor tracks. They also control movement of earth moving implements such as the boom, arm and bucket of an excavator and the blade of a dozer. In some cases the dozer blade movement is articulated in that it can be raised and lowered, angled or skewed, and tilted. To facilitate such multi-facet operations, omnidirection hand controls are used which sometimes are referred to as joy sticks. These enable an operator to execute two operations simultaneously by manipulating a single handle or stick. Typically this is combined in relation to x-y axes of control such as, for example, raising and lowering by fore and aft stick movement and tilting left down and right down by lateral movement of the stick.

Though the use of omnidirection controls do combine two independent control functions into a single controller, as more sophisticated equipment with more control functions are developed the more control consoles nevertheless become crowded. Operator cabs today have arrays of buttons and switch panels, foot pedals and control sticks beside both sides of the operator seat. Each time another control is added, it is done at the expense of the limited space available and operator comfort. For example, if an operator has to keep his elbow raised over a control in manipulating another one, such is both fatiguing and entails the risk of accidental movement of the ergonomically hindering control mechanism. Furthermore, such can force the operator to have to keep his hand at a skewed angle with respect to his forearm as he grips a control. Also, more controls also require more hydraulic pilot lines to converge in a limited space where they enter a controller within the console. With the recent advent of earth moving equipment that combine excavator and dozers into a single piece of equipment, the problem of overcrowding of operator cabs has become even more pronounced.

Accordingly, it is seen that a need exists for an operator cab for earth moving equipment with multiple controls interrelatedly located with both ergonomic and operational efficiency and comfort in a console beside an operator seat. It is to the provision of such that the present invention is primarily directed.

SUMMARY OF THE INVENTION

In a preferred form of the invention, an excavator operator cab has an operator seat and a control console mounted beside the seat with a forward control stick positioned aside a forward portion of the seat and with a rear control stick positioned rearwardly of the forward control stick aside a mid portion of the seat. The rear control stick has an arm pad mounted thereon at a height and distance relative to the forward control stick to support the arm of an operator while he grips and manipulates the forward control stick while seated on the seat. By depressing his or her forearm downwardly upon the rear control stick arm the operator may also manipulate the rear control stick independently of or in concert with manipulation of the forward control stick.

In another preferred form of the invention, an excavator operator cab has an operator seat and a control console mounted beside the seat with a forward control stick positioned aside a forward portion of the seat and with a rear control stick positioned rearwardly of the forward control stick aside a mid portion of the seat. The rear control stick is neutrally positioned uprightly and the forward control stick is neutrally positioned along an incline that extends forward at an acute angle with the rear control stick upright neutral position. Preferably the forward control stick has a handle oriented uprightly and generally parallel with the rear control stick. With this construction an operator sitting on the seat may extend and retract his or her forearm from hand gripping positions about the forward and rear control sticks without significant cocking of the wrist.

In yet another preferred form of the invention a method of manually manipulating two controls of an excavator with one arm while seated in an operator cab seat is done by gripping and manipulating a forward control with the arm hand while depressing and manipulating a rear right control with the forearm.

DETAILED DESCRIPTION

Figure 1:
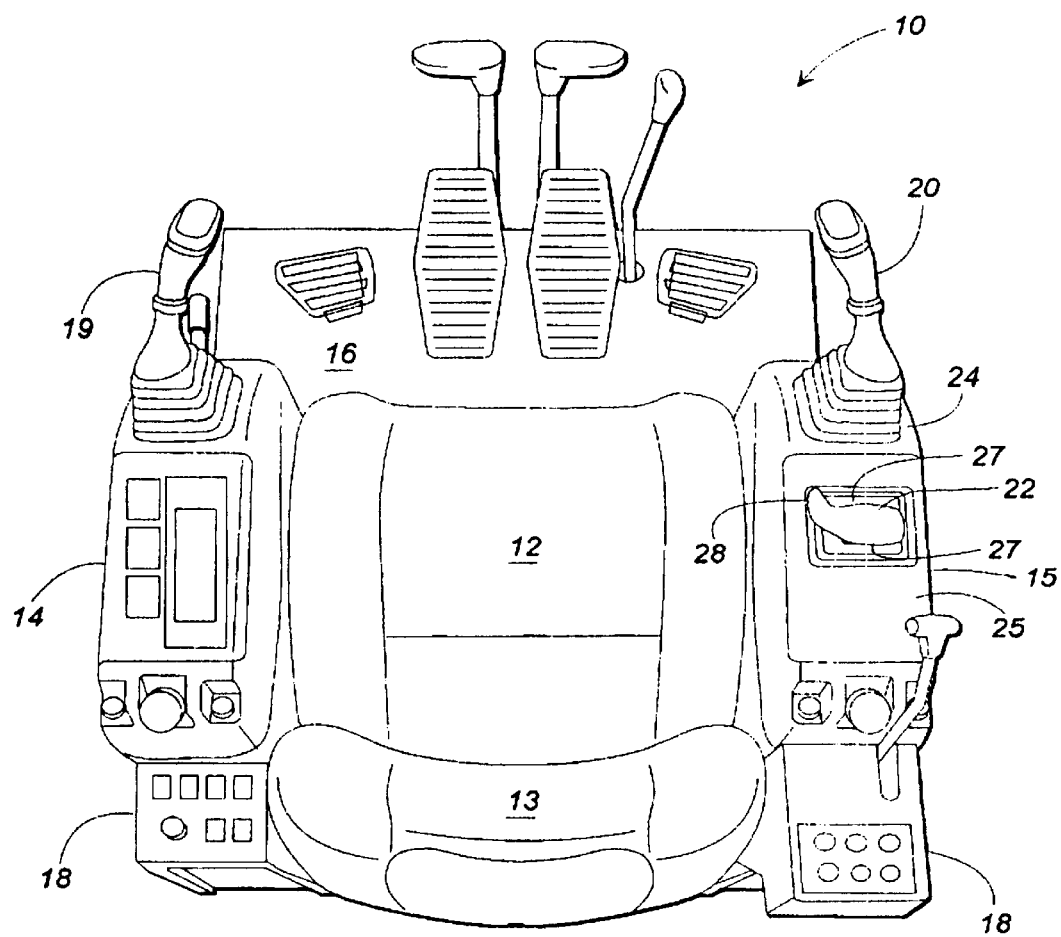
FIG. 1 is a plan view of an excavator operator cab that embodies principles of the invention.

With reference next to FIG. 1, there is shown an excavator operative cab 10 having an operator seat 12 with an upright seat back 13. Two control consoles 14 and 15 straddle the seat 12. Several equipment operating foot pedals are mounted in front of the seat upon the cab floor 16. Two switch panels 18 straddle the seat back 13. Console 14 has a manual control stick 19. Console 15 has a forward control stick 20 located aside a forward portion of the seat 12 and a rear control stick 22 located aside a mid portion of the stick. The forward control stick 20 is mounted on a front top portion 24 of the console 15 so that it is on an inclined plane that slopes downwardly toward the front of the cab. The rear control stick 22 is mounted on a midpart 25 of the console top that slopes downwardly towards the rear of the cab from the front portion 24.

The forward control stick 20 includes bellows that extend along a forward incline at a normal angle with the console top portion 24. A handle extends uprightly from the top of the bellows. Thus the unshown control rod within the bellows and handle has an angular jog or bend where it emerges from the bellows. The handle may be moved omnidirectionally in a conventional joy-stick manner.

The rear control stick 22 has bellows that are mounted uprightly on the rearwardly inclined console top portion 25. A handle extends upright from the bellows. This handle however has a pad at its top with a generally flat, level top surface and with rounded front and rear surfaces 27. It also has a button support protrusion that projects towards the front of the seat 12. An electric switch button may be mounted on this protrusion that may be thumb activated with the hand that grips the pad. Alternatively this pad may be used as a support for the forearm of the operator. Preferably the rear control stick is also omnidirectionally operated as a conventional joy stick. The forward and rear control sticks are mounted fore and aft of each other beside the seat 12 at a spacing for an operator to grip the forward control stick while his forearm is supported atop the rear control stick with his or her arm generally level. Thus, the top of the pad 26 of the rear control stick 22 is located at about the height of the bottom of the hand gripping portion of the forward control stick handle.

Each of the control sticks has conventional transducer boxes mounted to the undersurface of the top wall of the hollow console 15. Within these boxes manual position sensors sense the angle of the stick and in response thereto operate valves in pilot or control hydraulic lines. A set of pilot hydraulic lines thus extend downwardly from each box. Since the lower portions of the sticks are on convergent axes at an acute angle with one another, this enables their hydraulic pilot lines also to converge as two bundles. At their convergence they merge together into an open end of a single conduit that extends out of the console to the power hydraulic system of the equipment in a space conserving manner.

Figure 2A:
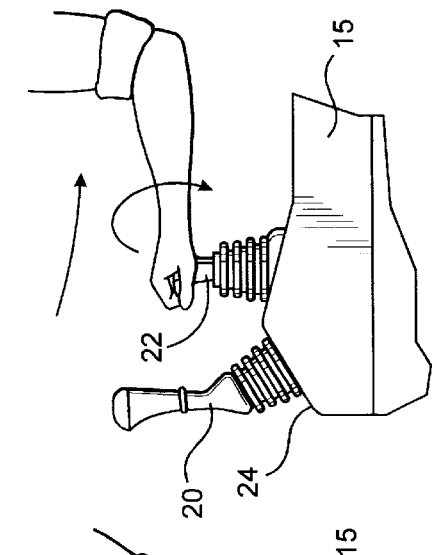
FIGS. 2A, 2B, and 2C are side views of two hand controls of the cab shown in FIG. 1 shown with an operator's arm in three different positions.
Figure 2B:
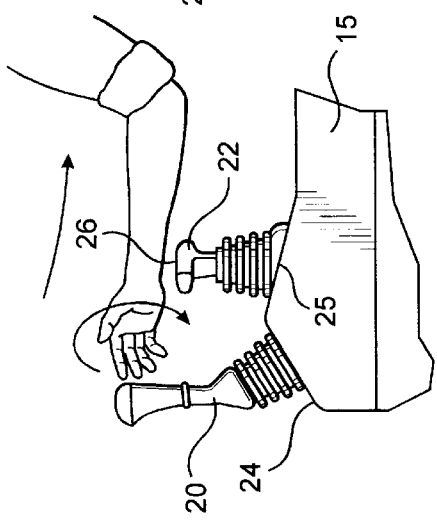
Figure 2C:
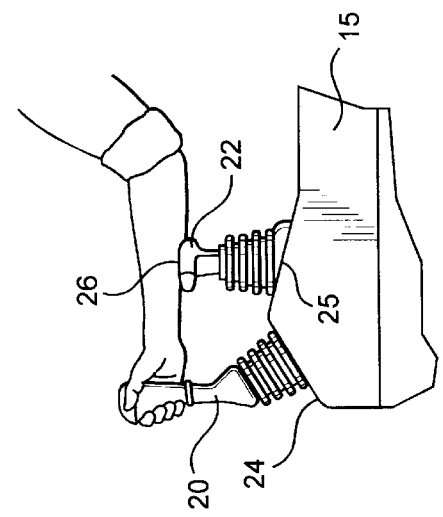

With reference next to FIG. 2, it may be visualized how an operator may manipulate the control sticks while seated on seat 12. On the leftmost illustration of the series, the operator is shown gripping the handle of the forward control stick 20 with his forearm resting atop the pad 26 of the rear control stick 22. Note that his wrist is not cocked with the handle in its neutral upright position. In other words, his hand is in an ergonomically neutral position when the control handle is in its mechanically neutral position. He may now move the handle fore and aft and laterally while his forearm remains supported on the rear control stick. Moreover, he can simultaneously move the rear control stick laterally by exerting firm downward and lateral pressure on the pad. He may also move the two control sticks simultaneously forwardly and rearwardly with his one arm in unison.

As shown in the center and right side illustrations of FIG. 2, the operator may release the forward control stick and move his hand to a position gripping the pad of the rear control stick. In doing so he simply lifts his forearm slightly off the pad and rotates his wrist some 90 degrees as shown by the arrows. Note that while gripping the rear control stick pad that his forearm is once again nearly level in a natural position even though the elbow has somewhat realigned the arm so that the forearm and upper arm have moved from a slightly obtuse angular relation to one that is more right angular.

Figure 3A:
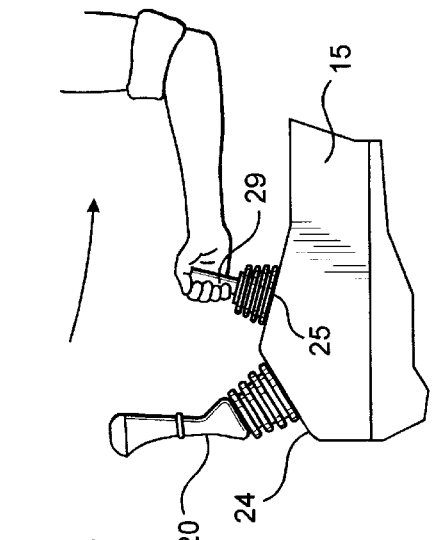
FIGS. 3A, 3B, and 3C are side views of the two hand controls shown in a modified form.
Figure 3B:
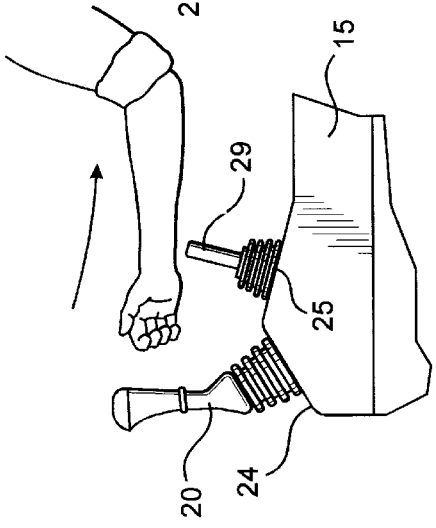
Figure 3C:
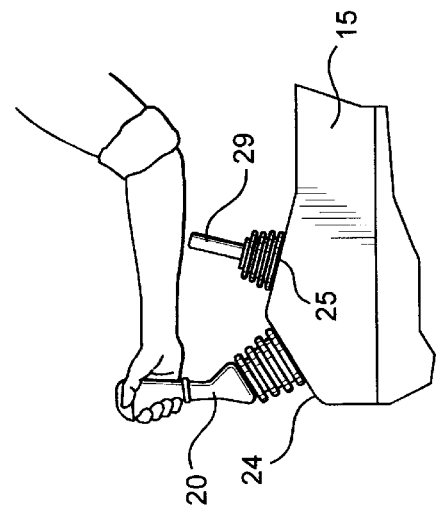

A modified version of the rear control stick is shown in FIG. 3. Here the rear control stick 29 does not have the pad 26. Its top thus does not provide a good, comfortable support for the forearm. Other than that this arrangement does possess the attributes of the other embodiment but also enables the operator to change control grips between the two control sticks without rotation of his hand.

It thus is seen that an operator cab is now provided for an excavator or other earth working equipment with improved manual controls. While the invention has been shown and described in its preferred form, it should be realized that many modifications, changes, additions and deletions, in addition to those expressly recited, may be made thereto without departure from the spirit and scope of the invention as set forth in the following claims.

What is claimed is:

1. An excavator operator cab having an operator seat and a control console mounted beside said seat with a forward control stick positioned aside a forward portion of said seat and with a rear control stick positioned rearwardly of said forward control stick aside a mid-portion of said seat, said rear control stick being neutrally positioned uprightly and said forward control stick being neutrally positioned along an incline that extends forwardly at an acute angle with said rear control stick upright neutral position whereby an operator sitting on the seat may extend and retract his forearm from hand gripping positions about the forward and rear control sticks without significant cocking of the wrist.

2. The excavator operator cab of claim 1 further comprising an arm pad mounted upon said rear control stick at a height and distance relative to said forward control stick to support the fore arm of an operator while he grips and manipulates said forward control stick while being seated on said seat.

3. The excavator operator cab of claim 1 wherein said forward and rear control sticks are moveable multi-directionally and wherein a handle is mounted to an upper portion of said forward control stick and an arm pad is mounted to said rear control stick at a height lower than an uppermost portion of said handle.

4. A method of manually manipulating two controls of an excavator using simultaneously a hand and a forearm of one arm while seated in an operator cab seat comprising the steps of (a) placing the hand of the arm upon a forward control and placing the forearm of the arm on a rear control; and (b) manipulating the forward control with the hand while manipulating the rear control with the forearm.

* * * * *